United States Patent
Tanaka

(10) Patent No.: US 8,775,170 B2
(45) Date of Patent: Jul. 8, 2014

(54) DIGITAL VOICE COMMUNICATION CONTROL DEVICE AND METHOD

(75) Inventor: Akihiro Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 459 days.

(21) Appl. No.: 13/266,323

(22) PCT Filed: Apr. 27, 2010

(86) PCT No.: PCT/JP2010/003002
§ 371 (c)(1),
(2), (4) Date: Oct. 26, 2011

(87) PCT Pub. No.: WO2010/125802
PCT Pub. Date: Nov. 4, 2010

(65) Prior Publication Data
US 2012/0046941 A1 Feb. 23, 2012

(30) Foreign Application Priority Data

Apr. 30, 2009 (JP) .............................. 2009-110529

(51) Int. Cl.
*H04M 3/56* (2006.01)
*G10L 21/02* (2013.01)

(52) U.S. Cl.
USPC ......... 704/225; 704/226; 370/260; 379/202.1

(58) Field of Classification Search
USPC ................. 704/225, 226; 370/260; 379/202.1
See application file for complete search history.

(56) References Cited

U.S. PATENT DOCUMENTS

| 6,404,873 | B1 * | 6/2002 | Beyda et al. | 379/202.01 |
| 7,006,617 | B1 | 2/2006 | Dal Farra et al. | |
| 8,392,180 | B1 * | 3/2013 | Lachapelle et al. | 704/225 |
| 2003/0138108 | A1 * | 7/2003 | Gentle | 381/23 |
| 2006/0062366 | A1 * | 3/2006 | Tiruthani et al. | 379/201.01 |
| 2008/0260132 | A1 * | 10/2008 | Zhang et al. | 379/202.01 |
| 2009/0226010 | A1 * | 9/2009 | Schnell et al. | 381/119 |
| 2009/0228285 | A1 * | 9/2009 | Schnell et al. | 704/500 |

FOREIGN PATENT DOCUMENTS

| JP | 07-202888 A | 8/1995 |
| JP | 2001-203815 A | 7/2001 |
| JP | 2006-203548 A | 8/2006 |

OTHER PUBLICATIONS

International Search Report for PCT/JP2010/003002, Jul. 13, 2010.

* cited by examiner

*Primary Examiner* — Daniel D Abebe
(74) *Attorney, Agent, or Firm* — McDermott Will & Emery LLP

(57) ABSTRACT

A digital audio communication control apparatus includes a first mixing unit that mixes a voice input from a voice input unit and uttered by a specific speaker with a voice input from a digital audio packet receiving unit and uttered by at least one speaker except for the specific speaker, and a second mixing unit that mixes the voices mixed by the first mixing unit with the voice of the specific speaker. The voices mixed by the second mixing unit are fed back to the specific speaker.

23 Claims, 13 Drawing Sheets

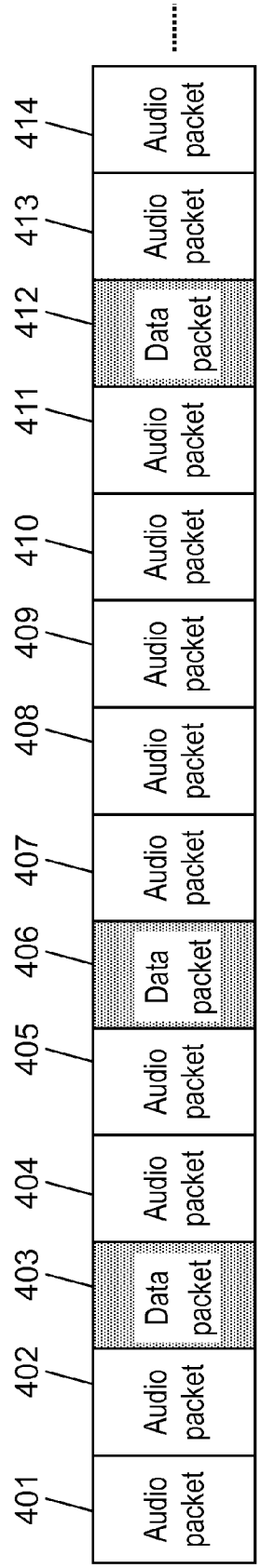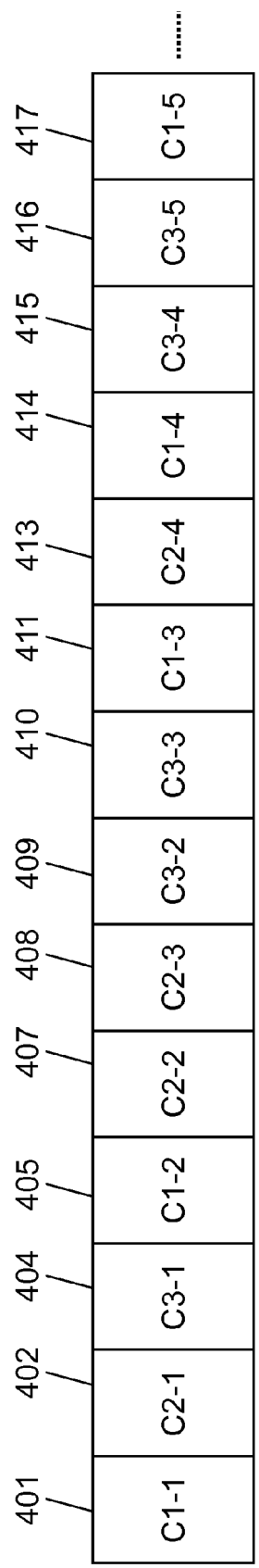

FIG. 7A  Digital audio stream 701: C1-1, C1-2, C1-3, C1-4, C1-5, C1-6, C1-7, C1-8, C1-9, C1-10, ...

FIG. 7B  Digital audio stream 702: C2-1, C2-2, C2-3, C2-4, C2-5, C2-6, C2-7, C2-8, C2-9, C2-10, ...

FIG. 7C  Digital audio stream 703: C3-1, C3-2, C3-3, C3-4, C3-5, C3-6, C3-7, C3-8, C3-9, C3-10, ...

FIG. 7D  Digital audio stream 704: F-1, F-2, F-3, F-4, F-5, F-6, F-7, F-8, F-9, F-10, ...

Input buffer for digital audio stream 701

Input buffer for digital audio stream 702

Input buffer for digital audio stream 702

Input buffer for digital audio stream 703

FIG. 10A

Output buffer for announcement

| C3-1 | C3-2 | C3-3 | C3-4 | C3-5 |
|---|---|---|---|---|

FIG. 10B

Output buffer for speech communication (cabin)

| C1-1 + C2-1 + F-1 | C1-2 + C2-2 + F-2 | C1-3 + C2-3 + F-3 | C1-4 + C2-4 + F-4 | C1-5 + C2-5 + F-5 |
|---|---|---|---|---|

FIG. 10C

Output buffer for speech communication (flight deck)

| C1-1 + C2-1 | C1-2 + C2-2 | C1-3 + C2-3 | C1-4 + C2-4 | C1-5 + C2-5 |
|---|---|---|---|---|

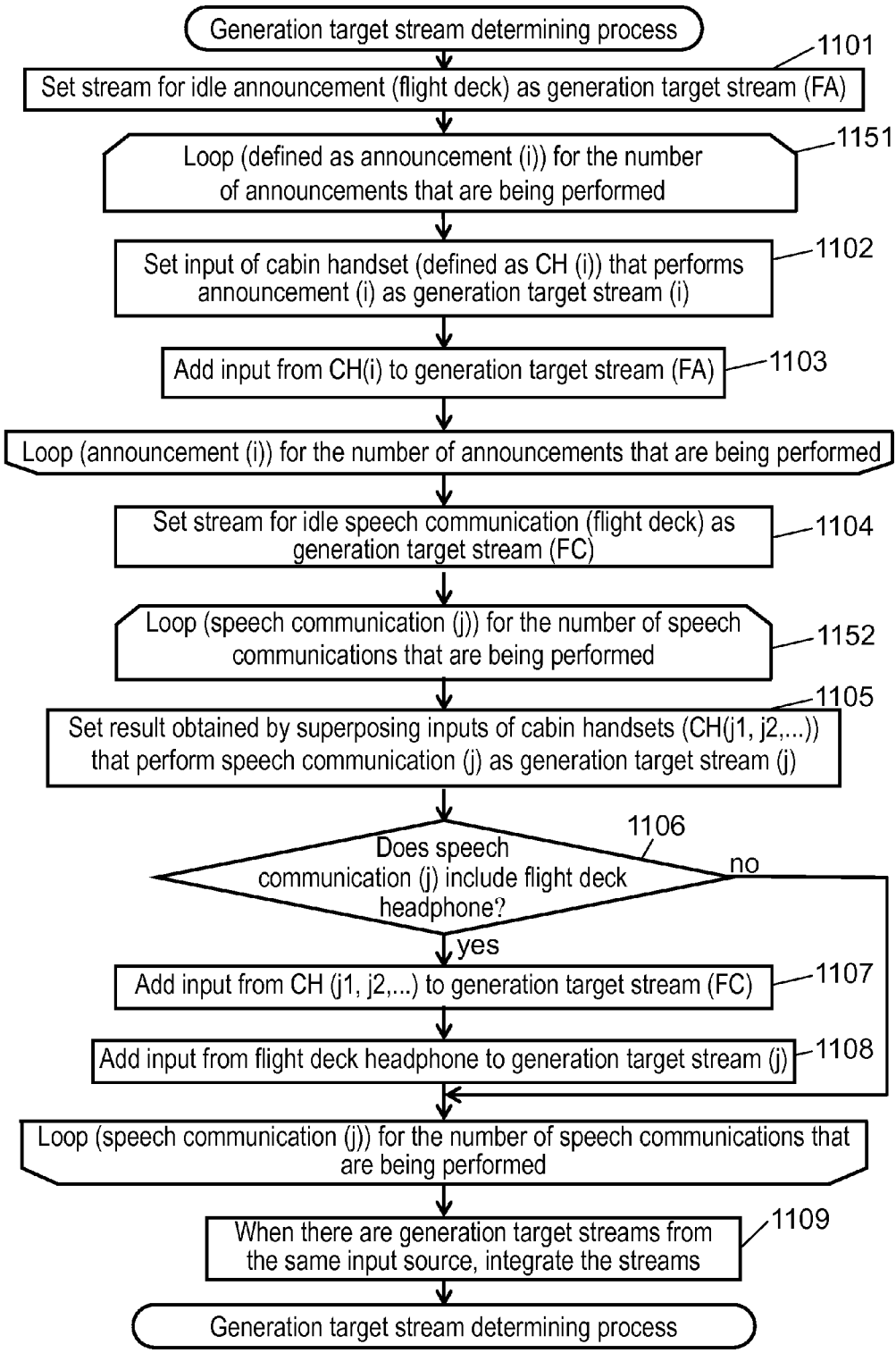

FIG. 12A

Input from digital audio stream 1200 for speech communication (first mixing unit 205)

| 1201 | 1202 | 1203 | 1204 | 1205 | 1206 | 1207 | 1208 | 1209 |
|---|---|---|---|---|---|---|---|---|
| C1-1 + C2-1 | C1-2 + C2-2 | C1-3 + C2-3 | C1-4 + C2-4 | C1-5 + C2-5 | C1-6 + C2-6 | C1-7 + C2-7 | C1-8 + C2-8 | C1-9 + C2-9 |

FIG. 12B

Digital audio stream 1210 for speech communication (input from A/D converter 202)

| 1211 | 1212 | 1213 | 1214 | 1215 | 1216 | 1217 | 1218 | 1219 |
|---|---|---|---|---|---|---|---|---|
| F-9 | F-10 | F-11 | F-12 | F-13 | F-14 | F-15 | F-16 | F-17 |

FIG. 12C

Output digital audio stream 1220 (output to D/A converter 207)

| 1221 | 1222 | 1223 | 1224 | 1225 | 1226 | 1227 | 1228 | 1229 |
|---|---|---|---|---|---|---|---|---|
| C1-2 + C2-2 + F-9 | C1-3 + C2-3 + F-10 | C1-4 + C2-4 + F-11 | C1-5 + C2-5 + F-12 | C1-5 + C2-5 + F-13 | C1-6 + C2-6 + F-14 | C1-7 + C2-7 + F-15 | C1-8 + C2-8 + F-16 | C1-9 + C2-9 + F-17 |

DIGITAL VOICE COMMUNICATION CONTROL DEVICE AND METHOD

This application is a U.S. National Phase application of PCT International Phase Application No. PCT/JP2010/003002.

TECHNICAL FIELD

The present invention relates to a digital audio communication control apparatus and method to mainly broadcast (in this specification, "announce" is used as an equivalent term) speaker's voice to a place distant from a place where the speaker is present.

BACKGROUND ART

In recent years, with the development of a communication network technique, an announcement or the like with a voice that has been realized by using a conventional analog signal has been able to be also realized by converting speaker's voice into digital signals and transmitting a digital audio packet obtained by packeting the digital signals on a digital communication network.

When a voice is digitized, an announcement can be freely performed to some of a plurality of divided announce areas without requiring complex wiring, or a plurality of speakers can simultaneously perform an announcement to the same area or different areas.

Furthermore, by using the same receiver, a speech communication can also be performed between a plurality of speakers on the same digital communication network. For example, one person performs an announcement to a target area, and, at the same time, two persons perform a speech communication with each other by using receivers connected to the same digital communication network. At this time, human voices are digitally packeted on transmission sides and multiplexed and transmitted on the digital communication network, only a necessary packet is acquired on a reception side, and the acquired packet is decoded and reproduced to realize a speech communication.

In general, when an announcement is performed to a place where a broadcasted voice cannot be heard because the place is distant from a speaker, or when speaker's voice itself is belatedly returned in conversation between a plurality of speakers or not heard at all, the speaker may receive an uncomfortable feeling when the speaker perform an announcement or conversation. In an announcement, since there is no way of confirming whether a voice is actually output to a target area, the possibility of causing the speaker to feel uneasy cannot be denied.

In contrast to this, when an announcement or a speech communication are realized by using a plurality of analog lines, a receiver or a broadcasting apparatus that receives speaker's voice directly feeds back the received analog voice to the receiver of the speaker, and the fed-back voice is output from the receiver of the speaker. In this manner, the uncomfortable feeling of the speaker is reduced, and it can be confirmed by the speaker that voice reliably reaches the reception side.

However, when digital audio packets formed by a plurality of sound sources are used for various purposes, digital voice processing needs to be performed halfway. In the digital voice processing, digital audio packets obtained for a predetermined period of time are inevitably buffered and subjected to a mixing process or a volume control process after the mixing with another digital audio packet. For this reason, processing delay is essentially inevitable. Due to the delay, a speaker who hears her/his fed-back voice cannot avoid an uncomfortable feeling.

According to Patent Literature 1, there is disclosed a method of multiplexing speaker's voice with another voice to feed back the multiplexed voice to the speaker.

According to Patent Literature 2, there is disclosed a method of selectively feeding back only a voice of a speaker required by a hearer to the hearer in a conference of a plurality of speakers.

However, in both Patent Literature 1 and Patent Literature 2 described above, when the number of voices required by a hearer increases, a CPU (Central Processing Unit) or a DSP (Digital Signal Processor) requires a higher processing capacity, and it cannot be completely avoided that a delay that is enough to cause a person to receive an uncomfortable feeling occurs.

CITATION LISTS

Patent Literatures

PTL 1: Unexamined Japanese Patent Publication No. 7-202888
PTL 2: Unexamined Japanese Patent Publication No. 2006-203548

SUMMARY OF THE INVENTION

A digital audio communication control apparatus according to the present invention includes: a first voice input unit that receives a voice from a specific speaker as a first audio signal; a second voice input unit that receives a voice of at least one speaker except for the specific speaker as second audio signals; a first mixing unit that mixes the first audio signal and the second audio signals with each other to generate at least one third audio signal; a second mixing unit that mixes the first audio signal with one audio signal of the second audio signals to generate one fourth audio signal; a first voice output unit that outputs at least one third audio signal to the outside; and a second voice output unit that outputs the fourth audio signal to the outside.

With the above configuration, even though the mixing process requires complex conditions, the mixing process of a fed-back voice to the specific speaker is performed by using the second mixing unit to make it possible to execute the process with a small delay falling within a predetermined range without being received by another voice and to make it possible to prevent a speaker who hears her/his fed-back voice from receiving an uncomfortable feeling.

An digital audio communication control method according to the present invention includes: a voice input step of receiving an analog audio signal from a specific speaker; an A/D converting step of converting an analog audio signal into a first digital audio stream; a digital audio packet receiving step of receiving digital data obtained by multiplexing a digital audio packet and data packet that form a digital audio stream of at least one speaker except for the specific speaker and extracting only the digital audio packet from the digital data; a digital audio packet separating step of separating the digital audio packet extracted in the digital audio packet receiving step into individual digital audio packets for respective speakers to construct second digital audio streams for the speakers; a first mixing step of mixing the first digital audio stream with the second digital audio stream to generate at least one third digital audio stream; a second mixing step of mixing the first digital audio stream with one digital audio stream of the third digital audio streams to generate a fourth output digital audio stream; a digital audio packet transmitting step of multiplexing at least one third digital audio stream generated in the first mixing step to output the multiplexed stream to the outside of the apparatus; a D/A converting step of converting the fourth digital audio stream generated in the second mixing step into an analog audio signal; and a voice feedback step of outputting the analog audio signal converted in the D/A converting step to the outside of the apparatus.

BRIEF DESCRIPTION OF DRAWINGS

FIG. 4A is a block diagram showing an example of input data to the digital audio communication control apparatus.

FIG. 4B is a block diagram showing an example of input data to the digital audio communication control apparatus.

FIG. 7A is a block diagram showing an example of a digital audio stream serving as an input to a first mixing unit.

FIG. 7B is a block diagram showing an example of the digital audio stream serving as an input to the first mixing unit.

FIG. 7C is a block diagram showing an example of the digital audio stream serving as an input to the first mixing unit.

FIG. 7D is a block diagram showing an example of the digital audio stream serving as an input to the first mixing unit.

FIG. 10A is a block diagram showing an example of a state of an output buffer.

FIG. 10B is a block diagram showing an example of the state of the output buffer.

FIG. 10C is a block diagram showing an example of the state of the output buffer.

FIG. 11 is a flow chart showing a determining process for a digital audio stream to be output.

FIG. 12A is a block diagram showing an example of a generated output digital audio stream.

FIG. 12B is a block diagram showing an example of the generated output digital audio stream.

FIG. 12C is a block diagram showing an example of the generated output digital audio stream.

DESCRIPTION OF EMBODIMENTS

In the present invention, a mixing process for a feedback voice is performed by using a second mixing unit such that a speaker who hears her/his fed-back voice is prevented from receiving an uncomfortable feeling caused by delay.

First Exemplary Embodiment

In the embodiment, a system that realizes in-flight broadcasting in an airplane and an in-flight speech communication between crews will be described by way of example with reference to the accompanying drawings.

Figure 1:
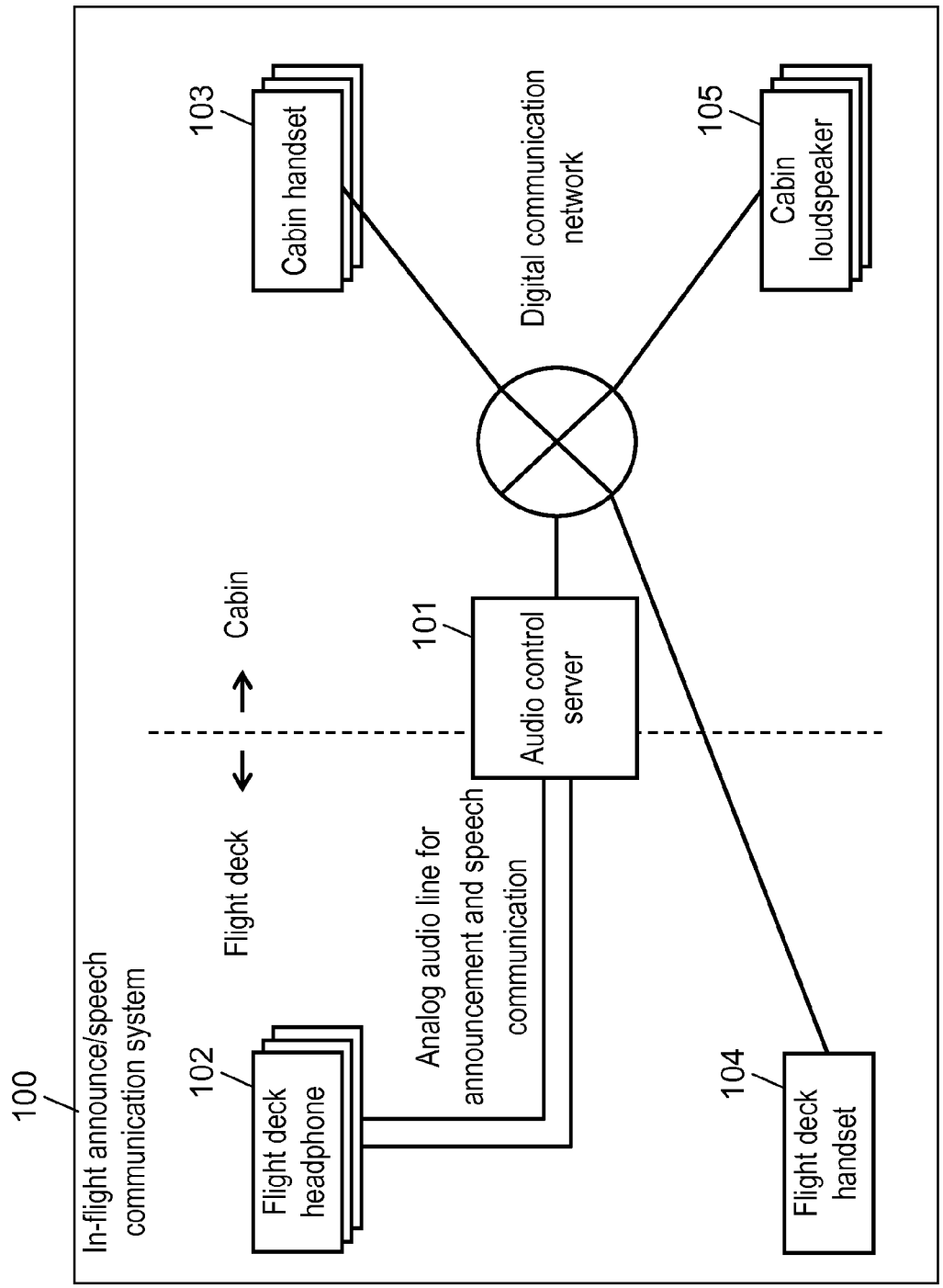
FIG. 1 is a schematic diagram of a configuration of an in-flight announce/speech communication system.

FIG. 1 is a schematic diagram of a configuration of an in-flight announce/speech communication system in an airplane. In-flight announce/speech communication system 100 is roughly configured by audio control server 101, flight deck headphone 102, flight deck handset 104, a plurality of cabin handsets 103, and a plurality of cabin loudspeakers 105.

Audio control server 101 is an apparatus that controls a voice flowing in overall in-flight announce/speech communication system 100 has a function of receiving a digital audio packet from flight deck handset 104 or cabin handset 103, a function of receiving an analog voice transmitted from flight deck headphone 102, and a function of converting the analog voice into a digital audio packet. In addition, audio control server 101 performs digital audio processing such as mixing, muting, and audio level control to the received and converted digital audio packet. Audio control server 101 transmits the digital audio packet generated by the digital audio processing to flight deck handset 104, cabin handsets 103, and cabin loudspeakers 105 and converts the generated digital audio packet into an analog voice to transmit the analog voice to flight deck headphone 102.

Flight deck headphone 102 is a device obtained by integrating a headphone and a microphone and used when a pilot in a flight deck (cockpit) performs an announcement to a cabin (passenger cabin) or speech-communicates with a crew or the like. By using flight deck headphone 102, the pilot can not only perform the speech communication but also can hear a voice obtained by feeding back a voice uttered by the pilot herself/himself. Unlike other devices, flight deck headphone 102 is not connected to audio control server 101 through a digital communication network but is connected to audio control server 101 through two analog lines. The analog lines are used for announcement and speech communication, respectively. In general, a plurality of flight deck headphones 102 are arranged for a copilot or a pilot observer. However, there is only one communication line connected to audio control server 101 for each of the announcement and the speech communication. For this reason, when a plurality of persons simultaneously perform an announcement and a speech communication, a result obtained by mixing the voices of the plurality of persons is transmitted to audio control server 101 through the analog lines.

Cabin handsets 103 are handsets (speech communication devices) installed at various positions in a cabin. Cabin handsets 103 have a function of converting a voice input by a crew into a digital audio packet and transmitting the digital audio packet to audio control server 101 and a function of receiving a digital audio packet from audio control server 101, converting the received digital audio packet into an analog voice, and outputting the analog voice, and the like. The crew in the cabin executes an announcement or a speech communication by using cabin handset 103.

Flight deck handset 104 is a handset installed on a flight deck, and has the same functions as those of cabin handset 103. In a normal state, since a pilot uses flight deck headphone 102 for announcement or speech communication, flight deck handset 104 is strongly oriented to a spare used when a trouble occurs in flight deck headphone 102.

Cabin loudspeakers 105 is a loudspeaker installed in a cabin, and has a function of receiving a digital audio packet from audio control server 101, converting the received digital audio packet into an analog voice, and outputting the analog voice, and the like.

In in-flight announcement/speech communication system 100 configured as described above, when a pilot makes an announcement, an analog voice is transmitted to audio control server 101 by using flight deck headphone 102. In audio control server 101, the received analog voice is converted into a digital audio packet and subjected to necessary processes such as mixing or audio level control, and resultant packet to cabin loudspeaker 105 serving as a broadcasting target. The digital audio packet transmitted from audio control server 101 is converted into an analog voice again by cabin loudspeaker 105 and broadcasted in the plane.

On the other hand, when a crew in a cabin makes an announcement, a digital audio packet is transmitted to audio control server 101 by using cabin handset 103. In audio control server 101, the received digital audio packet is subjected to necessary processes such as mixing or audio level control, and transmitted to cabin loudspeaker 105 serving as a broadcasting target. The digital audio packet transmitted from audio control server 101 is converted into an analog voice again by cabin loudspeaker 105 to perform audio broadcast in the plane.

In general, since a loudspeaker has only a function of amplifying a voice, a device that converts a digital audio packet into an analog voice is required on the upstream stage of cabin loudspeaker 105. However, since this is not related to the substance of the present invention, the specification will be described on the assumption that cabin loudspeaker 105 also performs a process of converting a digital audio packet into an analog voice.

Figure 2:
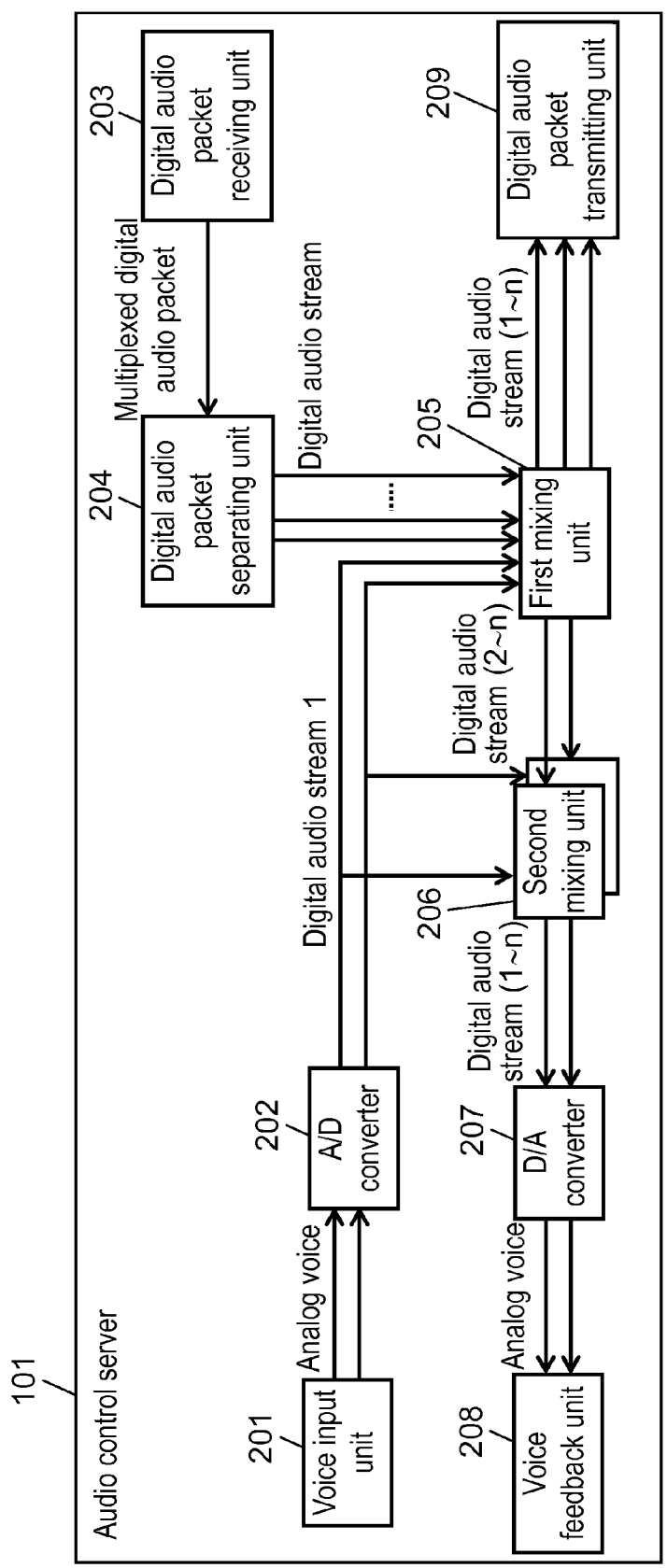
FIG. 2 is a block diagram showing a configuration of a digital audio communication control apparatus according to a first exemplary embodiment of the present invention.

FIG. 2 is a block diagram showing a configuration of audio control server 101 serving as the audio communication control apparatus according to the first exemplary embodiment of the present invention. Audio control server 101 includes voice input unit 201, A/D converter 202, digital audio packet receiving unit 203, digital audio packet separating unit 204, first mixing unit 205, second mixing unit 206, D/A converter 207, voice feedback unit 208, and digital audio packet transmitting unit 209.

It is assumed that voice input unit 201 is means that receives an analog voice input from flight deck headphone 102 and receives a voice uttered by a pilot through flight deck headphone 102 as an analog voice.

A/D converter 202 is means that converts the analog voice received by voice input unit 201 into a digital audio packet. By A/D converter 202, the received voice of the pilot is converted into a digital audio packet. The converted digital audio packet is a packet string (hereinafter referred to as a "first digital audio stream") in which the digital audio packets configured by only one voice (pilot's voice in this example) are chronologically arranged, and is given to first mixing unit 205 and second mixing unit 206.

Digital audio packet receiving unit 203 is means that receives a digital audio packet from cabin handset 103 and flight deck handset 104. Since digital audio packet receiving unit 203 receives data from a digital communication network, digital audio packet receiving unit 203 receives a packet except for a digital audio packet such as a data packet. In digital audio packet receiving unit 203, a packet except for the digital audio packet is discarded or given to another function, and only digital audio packets of a plurality of speakers are multiplexed. In this state, the multiplexed packet is given to digital audio packet separating unit 204.

Digital audio packet separating unit 204 separates the digital audio packet received from digital audio packet receiving unit 203 to generate a plurality of second digital audio streams each configured by one voice.

First mixing unit 205 receives a plurality of first and second digital audio streams, extracts necessary digital audio streams from the plurality of input digital audio streams, and mixes the digital audio streams. Necessary processes required in the mixing, for example, audio level control and gain control, are performed by first mixing unit 205. When the mixing process is performed by first mixing unit 205, one third digital audio stream obtained by superposing voices of the plurality of extracted digital audio streams is generated. First mixing unit 205 can take patterns of a plurality of types of the digital audio streams to be extracted.

For example, when digital audio streams a, b, and c of three types are input, a process of generating digital audio streams of two types, i.e., digital audio stream A that extracts digital audio streams a, b, and c as targets and digital audio stream B that extracts only digital audio streams a and b as targets can be performed. In this case, digital audio stream A is one digital audio stream obtained by superposing digital audio streams a, b, and c, and digital audio stream B is one digital audio stream obtained by superposing digital audio streams a and b. In the specification, when it is expressed that one digital audio stream is configured by superposing a plurality of voices, the content of digital audio stream A is expressed by using "+" as a+b+c, and the content of digital audio stream B is expressed by using "+" as a+b.

Second mixing unit 206 receives two digital audio streams (one of a first digital audio stream and a third digital audio stream) as inputs, mixes them, and outputs a fourth digital audio stream. As a process required for the mixing, only a required minimum process such as volume control is performed because a result by, for example, the mixing has an excessive volume. For this reason, as a buffer of second mixing unit 206, a buffer smaller than that of first mixing unit 205 can be used. Audio control server 101 has two second mixing units 206 for announcement and speech communication. Two second mixing units 206 are described here because mixing operations of two types are logically performed. However, it may be assumed that one second mixing unit 206 can handle 2×2 digital audio streams.

D/A converter 207 receives the fourth digital audio stream from second mixing unit 206, converts the received digital audio stream into an analog voice, and gives the analog voice to voice feedback unit 208.

Voice feedback unit 208 transmits the analog voice received from D/A converter 207 to flight deck headphone 102.

With reference to the drawings, a description will be given below of a digital audio communication control method used when an announcement and a speech communication are performed in in-flight announcement/speech communication system 100 with a central focus on an operation of audio control server 101.

Figure 3:
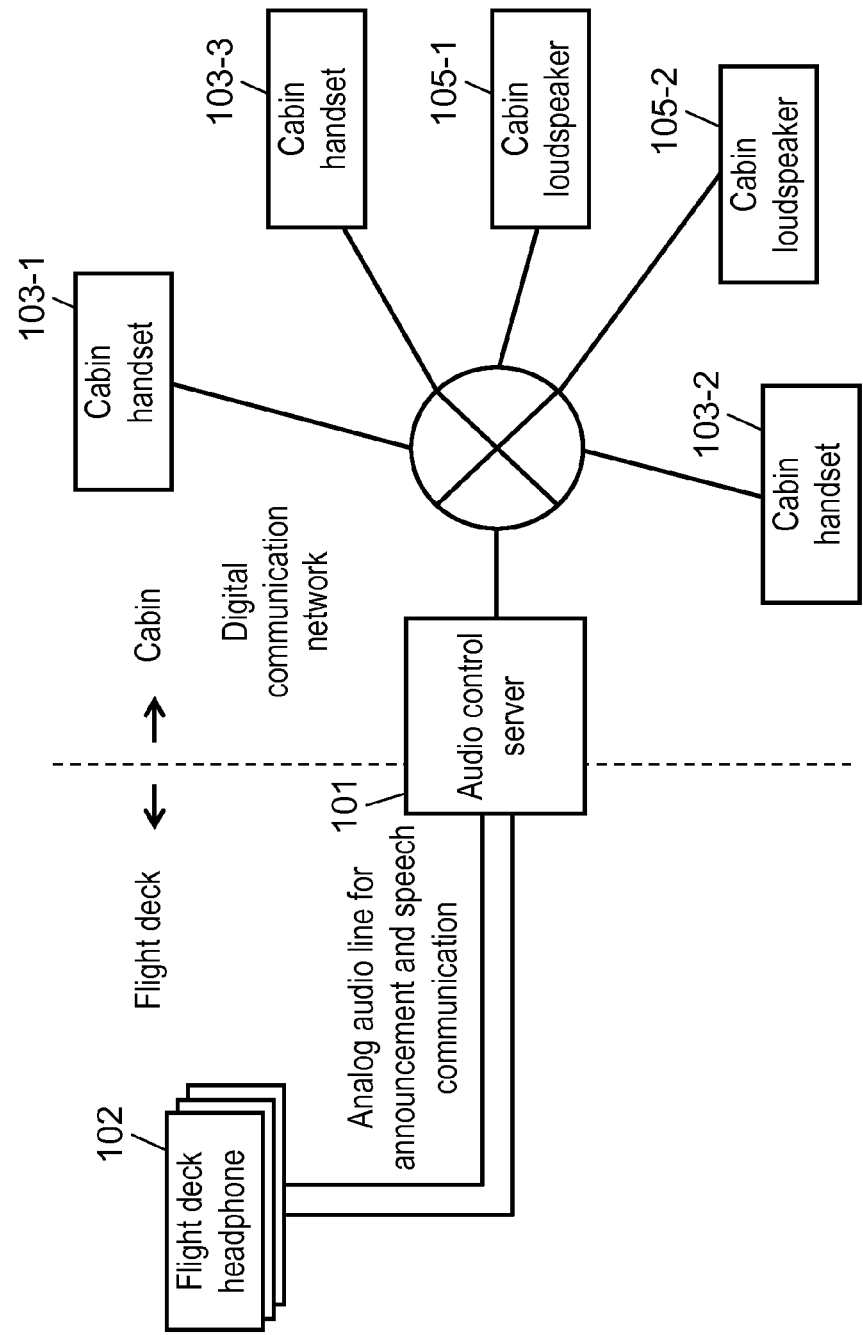
FIG. 3 is a schematic diagram showing an example of the configuration of the in-flight announce/speech communication system.

FIG. 3 is a schematic diagram showing an example of a configuration of in-flight announce/speech communication system 100. The embodiment shows an example in which a speech communication between cabin handset 103-1, cabin handset 103-2, and flight deck headphone 102 and an announcement from cabin handset 103-3 to cabin loudspeaker 105-1 are performed.

FIG. 4A is a block diagram showing an example of input data (packet) from a digital communication network to audio control server 101. In FIG. 4A, each left packet is input first in terms of time. More specifically, it is assumed that an audio packet 401, audio packet 402, audio packet 403, . . . , audio packet 414 are input in the order named. The packets mentioned here are not packets themselves for transfer such as TCP (Transmission Control Protocol) or UDP (User Datagram Protocol), but express sets of data having a predetermined meaning or sets of digital audio data for a predetermined period of time. As a protocol that provides a communication path to communicate a set of data, various protocols such as TCP, UDP, and ATM (Asynchronous Transfer Mode) are present. However, the present invention does not depend on the communication protocol, and a method of communicating a digital audio packet is not limited to a specific method.

The input data is received by digital audio packet receiving unit 203 and separated into digital audio packet and other data. In FIG. 4A, data packet 403, data packet 406, and data packet 412 are filtered by digital audio packet receiving unit 203 as packets except for the digital audio packet.

FIG. 4B is a block diagram showing a digital audio packet extracted as a result of a filtering process in digital audio packet receiving unit 203. It is assumed that packets to which the same number is added in FIGS. 4A and 4B are the same packet. Data packet 403, data packet 406, and data packet 412 that are included in FIG. 4A are not included in FIG. 4B. It is understood that FIG. 4B shows a result of the filtering process in digital audio packet receiving unit 203.

FIG. 4B shows detailed information of each digital audio packet. Each of the digital audio packets corresponds to a packet input from cabin handset 103-1, cabin handset 103-2, or cabin handset 103-3. Reference symbol C1-XX denotes an input from cabin handset 103-1, C2-XX denotes an input from cabin handset 103-2, and C3-XX denotes an input from cabin handset 103-3. In this case, XX denotes an arbitrary number.

Figure 5A:
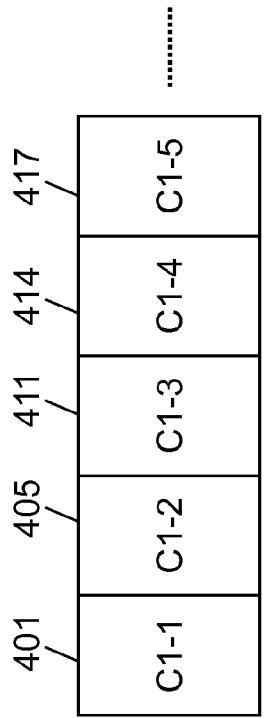
FIG. 5A is a block diagram showing an example of a digital audio stream after input data is separated.
Figure 5B:
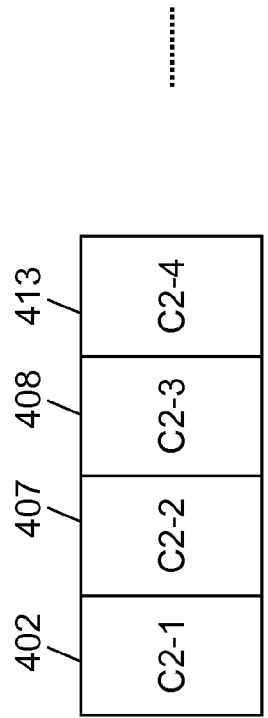
FIG. 5B is a block diagram showing an example of the digital audio stream obtained after the input data is separated.
Figure 5C:
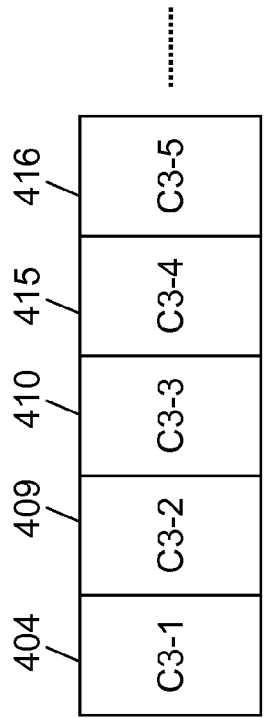
FIG. 5C is a block diagram showing an example of the digital audio stream obtained after the input data is separated.

A digital audio packet shown in FIG. 4B is separated into digital audio streams by digital audio packet separating unit 204. FIGS. 5A to 5C are block diagrams showing an example of a digital audio stream obtained after the digital audio packet shown in FIG. 4B is separated by digital audio packet separating unit 204. The digital audio packet that is originally multiplexed is separated into digital audio stream 501 serving as an audio input from cabin handset 103-1, digital audio stream 502 serving as an audio input from cabin handset 103-2, and digital audio stream 503 serving as an audio input from cabin handset 103-3.

Figure 6:
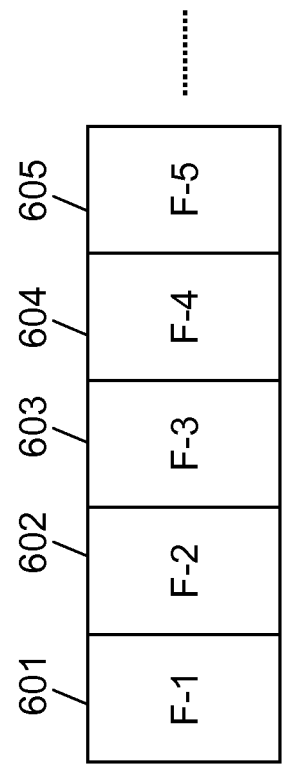
FIG. 6 is a block diagram showing an example of a digital audio stream obtained after an input voice is converted by A/D conversion.

On the other hand, a voice of a pilot input from flight deck headphone 102 to voice input unit 201 is converted into a digital audio stream by A/D converter 202. FIG. 6 shows an example of a configuration of the digital audio stream converted by A/D converter 202. Digital audio stream 601 obtained by digitally converting the voice of the pilot includes digital audio packet 601, digital audio packet 602, digital audio packet 603, . . . . Like digital audio stream 501, packets 601, 602, 603, . . . are chronologically sequentially shown from the left.

Digital audio streams 501 to 503 separated by digital audio packet separating unit 204 and digital audio stream 601 digitally converted by A/D converter 202 are input to first mixing unit 205. At the same time, digital audio stream 601 is also input to second mixing unit 206.

FIGS. 7A to 7D are block diagrams showing a plurality of digital audio streams serving as inputs to first mixing unit 205. FIGS. 7A to 7D do not directly correspond to FIGS. 5A to 5C and FIG. 6 in terms of packets. However, digital audio streams 701 to 703 and 710 indicate inputs from cabin handsets 103-1 to 103-3 and flight deck headphone 102, respectively, as described above.

Reference symbol XX denotes an arbitrary number, C1-XX denotes an input from cabin handset 103-1, C2-XX denotes an input from cabin handset 103-2, C3-XX denotes an input from cabin handset 103-3, and F-XX denotes an input from flight deck headphone 102. In this case, it is assumed that one packet from each of digital audio streams 501 to 503 and digital audio stream 601 expresses audio information for 4 msec and that, as input timings of the digital audio streams, the digital audio streams each having the same value XX are simultaneously input. For example, the packets of input C1-1 of digital audio stream 701 and input C2-1 of digital audio stream 702 represent voices uttered at the same timing for 4 msec, and C1-2 denotes a voice uttered for 4 msec at a timing 4 msec after input C1-1.

Figure 8:
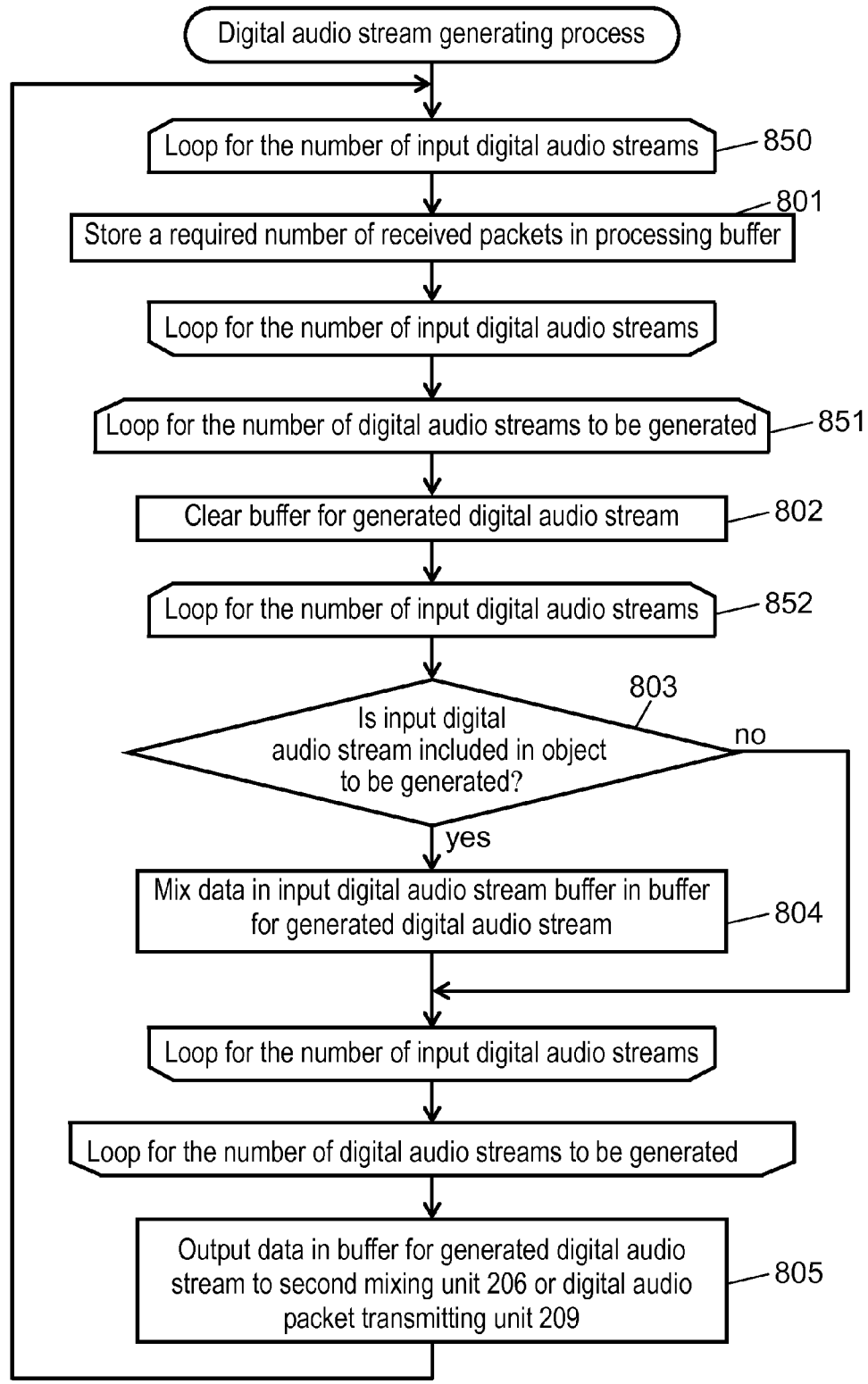
FIG. 8 is a flow chart showing an output digital audio stream generating process.
Figure 9A:
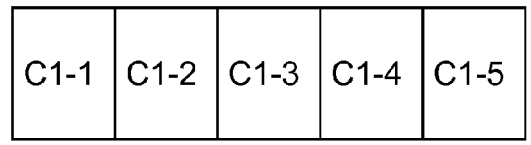
FIG. 9A is a block diagram showing an example of a state of an input buffer.
Figure 9B:
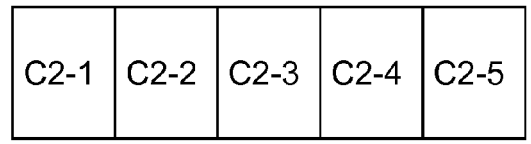
FIG. 9B is a block diagram showing an example of the state of the input buffer.
Figure 9C:
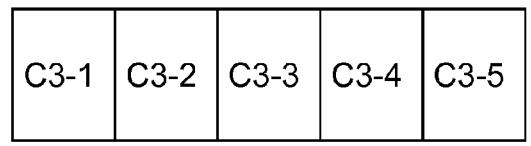
FIG. 9C is a block diagram showing an example of the state of the input buffer.
Figure 9D:
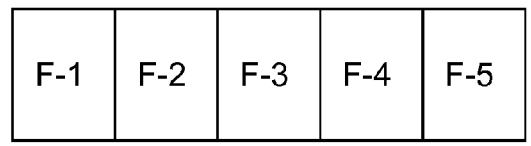
FIG. 9D is a block diagram showing an example of the state of the input buffer.

FIG. 8 is a flow chart showing a process performed when an output digital audio stream in first mixing unit 205 is generated. In first mixing unit 205, in step 801, packets required for the process are extracted from the received digital audio streams and stored in the buffers, respectively. In the embodiment, as an example, it is assumed that 5 packets, i.e., packets for 20 msec are required for the process.

FIGS. 9A to 9D show buffer states obtained when step 801 is executed to loop 850 after packet C1-5 is input when 20-msec interval between when a packet immediately previous to packet C1-1 is input to when packet C1-5 is input is used as a unit for processing. In a buffer for each of the digital audio streams, as shown in FIGS. 9A to 9D, packets YY-1 to YY-5 are stored. In this case, reference symbol YY denotes C1, C2, C3, or F.

The process in step 802 in FIG. 8 is performed. However, the process in step 802 is looped the number of times that is equal to the number of digital audio streams to be generated. In the embodiment, as the digital audio streams to be generated, digital audio streams for a speech communication and an announcement to be output to second mixing unit 206 and digital audio streams for a speech communication and an announcement to be output to digital audio packet transmitting unit 209 are targeted. As the digital audio streams for announcement, both a digital audio stream to be output to the second mixing unit 206 and a digital audio stream to be output to the digital audio packet transmitting unit 209 are targeted for digital audio stream 703. For this reason, one output buffer can be shared.

In the embodiment, although an announcement is generated from cabin handset 103-3, announcements for a plurality of areas may be simultaneously performed from the plurality of cabin handsets 103. In addition, a plurality of speech communications may simultaneously occur. For example, cabin handset 103-1 and cabin handset 103-2 perform a two-person speech communication, and cabin handset 103-3, cabin handset 103-4, cabin handset 103-5, and flight deck headphone 102 perform a 4-person speech communication.

As in the example described above, when a plurality of announcements and speech communications are simultaneously performed, the number of buffers required for first mixing unit 205 also increase. However, digital audio streams serving as outputs to voice feedback unit 208, i.e., serving as final outputs to the flight deck are stored in two buffers for a speech communication and an announcement at a maximum.

In the embodiment, since three digital audio streams are generated, loop 851 is executed three times. Loop 851 corresponding to the digital audio stream for announcement will be described first. The digital audio stream for announcement is common in both digital audio packet transmitting unit 209 and second mixing unit 206.

In step 802, an output buffer of the digital audio stream for announcement is cleared to shift to loop 852. In the embodiment, only one announcement is executed from cabin handset 103-3. Thus, yes is determined in step 803 only for digital audio stream 703 serving as an input from cabin handset 103-3. For this reason, packets C3-1 to C3-5 are stored in an output buffer of the digital audio stream for announcement.

A process of loop 851 about a digital audio stream for speech communication to be output to digital audio packet transmitting unit 209 will be described below. In step 802, an output buffer for speech communication (cabin) is cleared.

A loop process of loop 852 is performed. In the embodiment, since a speech communication is executed between cabin handset 103-1, cabin handset 103-2, and flight deck headphone 102, yes is determined in step 803 only for digital audio stream 701, digital audio stream 702, and digital audio stream 710. When the process in step 804 is executed to the digital audio streams, in an output buffer for speech communication (cabin), packets obtained by mixing digital audio packets C1-1 to C1-5, C2-1 to C2-5, and F-1 to F-5 in FIGS. 9A to 9D are stored.

As contents of the mixing process in step 804, various algorisms may be used. In the mixing, AGC (Automatic Gain Control), audio level control, and the like may be executed. The present invention is effective regardless of the mixing process executed in step 804 and the contents of other audio processing executed in the mixing. Even though a voice is compressed in terms of time, when appropriate units, for example, all data in the units are coordinated, digital audio packets are defined in units in which voices for a specific period can be completely reproduced to make it possible to perform the process.

After the process of loop 851 about the digital audio stream for speech communication output to the digital audio packet transmitting unit 209 is ended, the process of loop 851 about the digital audio stream for speech communication output to the second mixing unit 206 is executed. In step 802, an output buffer for speech communication (flight deck) is cleared.

As will be described below, as the digital audio stream for speech communication output to the second mixing unit 206, a digital audio stream input from the A/D converter 202 is not output. For this reason, yes is determined in step 803 when the input digital audio streams are digital audio stream 701 and the digital audio stream 702. Therefore, the process in step 804 is consequently executed to the two digital audio streams.

When the digital audio stream generating process described above is executed, the output buffer has states shown in FIGS. 10A to 10C. In this case, C1-1+C2-1+F-1 expresses that digital voices of digital audio packets C1-1, C2-1, and F-1 are mixed with each other to superpose three voices. Digital audio packet separating unit 204 gives the digital audio packet generated as described above to second mixing unit 206 and the digital audio packet transmitting unit 209.

The same process is repeated to the next packet group of the input digital audio stream, i.e., the digital audio packets C1-6 to C1-10, C2-6 to C2-10, C3-6 to C3-10, and F-6 to F-10 in FIGS. 7A to 7D.

A description will be given below in detail of a method of determining a digital audio stream to be generated, the method being repeated in loop 851 in the flow chart of FIG. 8.

FIG. 11 is a flow chart to determine a digital audio stream to be generated. In step 1101, a digital audio stream (generation target stream (FA)) for flight deck, i.e., to be output to second mixing unit 206 is set as an object to be generated. At this time, it is assumed that the generation target stream (FA) does not include any voice.

A process of loop 1151 is performed to all announcements that are being executed. In this case, for the sake of descriptive convenience, the announcements are ordered, and the ith announcement is called an announcement (i). In step 1102, a digital audio stream input from the cabin handset 103 (flight deck headphone 102 or flight deck handset 104) that executes the announcements is defined as a generation target stream (i). Furthermore, to the generation target stream (FA), inputs from cabin handset 103 (flight deck headphone 102 or flight deck handset 104) are added (step 1103).

Upon completion of the loop process of loop 1151, generation target streams the number of which is a number obtained by adding 1 to the number of announcements that are being executed are determined. For example, announcement 1 and announcement 2 are executed from cabin handset 103-1 and cabin handset 103-2, as generation target streams, three generation target streams including "generation target stream (1) configured by a stream from cabin handset 103-1", "generation target stream (2) configured by a stream from cabin handset 103-2", and "generation target stream (FA) configured by a stream from cabin handset 103-1 and a stream from cabin handset 103-2" are determined.

In steps subsequent to step 1104, a generation target stream for speech communication is determined. First, in step 1104, a digital audio stream (generation target stream (FC)) for flight deck, i.e., to be output to second mixing unit 206 is set as an object to be generated. At this time, it is assumed that the generation target stream (FC) does not include any voice.

A process of loop 1152 is performed to all speech communications that are being executed. In this case, for the sake of descriptive convenience, the speech communications are ordered, and the jth speech communication is called a speech communication (j). In step 1105, as a stream including all digital audio streams input from cabin handset 103 (or flight deck handset 104) that participates in the speech communications, generation target stream (j) is determined.

In step 1106, it is determined whether target speech communication (j) includes flight deck headphone 102. When target speech communication (j) includes flight deck headphone 102, the flow shifts to step 1107. When target speech communication (j) does not include flight deck headphone 102, the flow returns to the start of the loop process.

In step 1107, all digital audio streams input from cabin handset 103 (or flight deck handset 104) that participates in the target speech communication (j) are added to generation target stream (FC). Thereafter, in step 1108, an input from flight deck headphone 102 is added to generation target stream (j).

Upon completion of the loop process of loop 1152, generation target streams the number of which is a number obtained by adding 1 to the number of speech communications that are being executed are determined. For example, when speech communication 1 is executed between cabin handset 103-1 and cabin handset 103-2, when speech communication 2 is executed between cabin handset 103-3 and flight deck headphone 102, as generation target streams, three generation target streams including "generation target stream (1) configured by a stream from cabin handset 103-1 and a stream from cabin handset 103-2", "generation target stream (2) configured by a stream from cabin handset 103-3 and flight deck headphone 102", and "generation target stream (FC) configured by a stream from cabin handset 103-3" are determined.

Finally, in step 1109, when there are generation target streams from the same input source, a process of integrating the generation target streams into one stream is performed. For example, the function corresponds to buffers for announcement shown in FIGS. 10A to 10C. Since the process does not influence the present invention, the process need not be always executed.

First mixing unit 205 sequentially gives, of the generated digital audio streams, two streams to be output to a flight deck, i.e., "generation target stream (1) configured by a stream from cabin handset 103-1 and a stream from cabin handset 103-2" to second mixing unit 206 and gives the remaining digital audio streams to digital audio packet transmitting unit 209.

Digital audio packet transmitting unit 209 that receives the digital audio stream from first mixing unit 205 transmits the digital audio stream for announcement to cabin loudspeaker 105 belonging to a broadcast target area and transmits the digital audio stream for speech communication to cabin handset 103 that participates in the speech communication.

On the other hand, second mixing unit 206 that receives the digital audio streams from first mixing unit 205 and A/D converter 202 mixes output streams for announcement with each other and mixes streams for speech communication with each other. Details of the mixing process in second mixing unit 206 will be described below.

FIGS. 12A to 12C are diagrams showing a digital audio stream for speech communication (digital audio stream 1200 for speech communication) received by second mixing unit 206 from first mixing unit 205, a digital audio stream for speech communication (digital audio stream 1210 for speech communication) received from A/D converter 202, and a digital audio stream (output digital audio stream 1220) formed by mixing two streams by second mixing unit 206.

In FIGS. 12A to 12C, with respect to digital audio stream 1200 for speech communication and digital audio stream 1210 for speech communication, packets input at the same timing are described at the same position on the x-coordinate. Reference symbols C1-XX, C2-XX, and F-XX express that timings at which the digital audio streams are input to audio control server 101 are equal to each other. In this case, it is assumed that reference symbol XX denotes an arbitrary number.

When a process in first mixing unit 205 requires 12 msec after digital audio packets for 20 msec are stored in the buffer, a timing at which digital audio stream 1200 for speech communication is input to second mixing unit 206 is delayed by 8 packets in comparison with a timing at which digital audio stream 1210 for speech communication is input to second mixing unit 206. More specifically, a timing at which C1-1+C2-1 are input to second mixing unit 206 is equal to a timing at which F-9 is input.

When second mixing unit 206 receives the two digital audio packets, the second mixing unit 206 simply performs only a minimum process of mixing the digital audio packets with one digital audio packet. The second mixing unit 206, as shown in output digital audio stream 1220 in FIGS. 12A to 12C, generates a digital audio packet obtained by superposing the digital audio packet input from A/D converter 202 and the digital audio packet input 32-msec behind first mixing unit 205.

When second mixing unit 206 outputs the generated digital audio packet to D/A converter 207, D/A converter 207 converts the input digital audio packet into an analog voice and transmits the analog voice to the flight deck through voice feedback unit 208.

In second mixing unit 206, a process to a digital audio stream for announcement is performed by the same manner as that of the process to the digital audio stream for speech communication.

With the series of processes, even in a CPU/DSP that does not have so much processing abilities, a voice obtained by superposing a voice from flight deck headphone 102 with a necessary voice from cabin handset 103 without a great delay can be fed back to flight deck headphone 102.

More specifically, in the embodiment, a voice from the flight deck headphone can be fed back 32-msec earlier than a voice fed back by mixing all voices.

In this manner, a pilot can confirm that a voice from flight deck headphone 102 reliably reaches audio control server 101, and an uncomfortable feeling can be reduced by feeding back a voice of the pilot herself/himself without a great delay.

Also in second mixing unit 206, when a delay is of no matter, audio signal processing may be executed. At this time, first mixing unit 205 may also perform signal processing in advance on the assumption that specific signal process is executed in second mixing unit 206 to prevent the processing in second mixing unit 206 from becoming a heavy load. For example, second mixing unit 206 performs control or the like such that an audio level of a digital audio stream input from A/D converter 202 is set to 1/n and appropriate mixing is completed by only adding the digital audio stream to the digital audio stream input from the first mixing unit 205.

Second Exemplary Embodiment

Figure 13:
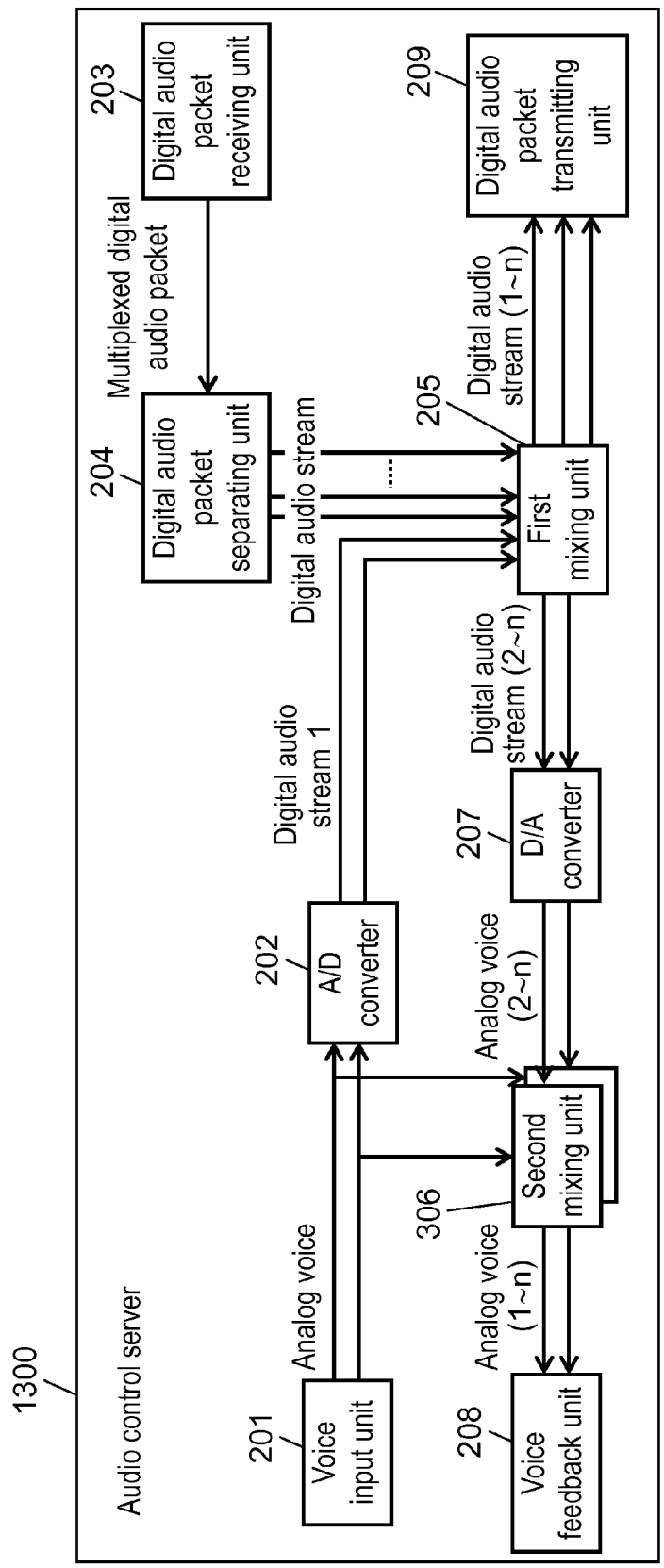
FIG. 13 is a block diagram showing a configuration of a digital audio communication control apparatus according to a second exemplary embodiment of the present invention.

FIG. 13 is a block diagram showing a digital audio communication control apparatus according to the second exemplary embodiment of the present invention, and shows a configuration of audio control server 1300 when second mixing unit 306 performs analog mixing.

The second exemplary embodiment is different from the first exemplary embodiment in that second mixing unit 306 does not mix digital audio streams but mixes analog audio signals.

For this reason, an analog audio signal received by voice input unit 201 is transmitted to A/D converter 202 and second mixing unit 306. A digital audio stream transmitted from first mixing unit 205 is converted into an analog audio signal by D/A converter 207, and the analog audio signal is transmitted to second mixing unit 306. In second mixing unit 306, the analog audio signal from voice input unit 201 and the analog audio signal from D/A converter 207 are mixed with each other, and the analog voice is transmitted to the flight deck through voice feedback unit 208.

In this case, second mixing unit 306 receives 2×2 analog voices and mixes the analog voices as analog voices. At this time, AGC, audio level control, or the like may be performed. The analog voice mixing process performed in this case may also be performed by a CODEC (COder/DECoder), dedicated hardware, or the like. A system configuration in which second mixing unit 306 in this case is included in flight deck headphone 102 may be used.

In the embodiment, digital audio packet transmitting unit 209 recognizes cabin handset 103 and cabin loudspeaker 105 serving as an output target, and transmits appropriate digital audio streams to cabin handset 103 and cabin loudspeaker 105. However, digital audio packet transmitting unit 209 does not select an output target, but may transmit all the digital audio streams to all cabin handset 103 and cabin loudspeaker 105. In this case, it is assumed that cabin handset 103 or cabin loudspeaker 105 that receives the digital audio stream has a function of recognizing a specific speech communication to which cabin handset 103 or cabin loudspeaker 105 belongs and a specific announce that is broadcasted by cabin handset 103 or cabin loudspeaker 105 and selectively reproducing a necessary digital audio stream.

In the embodiment, all voices during an announcement are fed back to flight deck headphone 102. However, only an announcement of a specific type may be fed back to flight deck headphone 102. For example, if it is assumed that announcements include announcements of two types, i.e., emergency broadcasting and background music, the process in step 1103 in FIG. 11 may be replaced with a process of adding an input from CH(i) to generation target stream (FA) only when target announcement (i) is emergency broadcasting. As a matter of course, there are a plurality of types of announcements, a database may be used as a criterion of the process in step 1103. Depending on not only the types of announcements but also cabin handset 103 serving as a broadcasting source, it may be determined whether a voice may be fed back to flight deck headphone 102.

In the embodiment, the in-flight announcement/speech communication system is described. However, as a matter of course, the present invention is not limited to a system in an airplane, and can also be used in a general announcement/speech communication system.

INDUSTRIAL APPLICABILITY

In a digital audio communication control apparatus and method according to the present invention, in a system that is required to simultaneously perform announcements to a plurality of areas and speech communications between a plurality of handsets on a plurality of lines, a speaker can make an announcement to a remote place or communicate with a plurality of parties without receiving an uncomfortable feeling. In particular, the system is useful as an in-flight announcement/speech communication system.

REFERENCE MARKS IN THE DRAWINGS

100 In-flight announce/speech communication system
101 Audio control server
102 Flight deck headphone
103 Cabin handset
104 Flight deck handset
105 Cabin loudspeaker
201 Voice input unit
202 A/D converter
203 Digital audio packet receiving unit
204 Digital audio packet separating unit
205 First mixing unit
206 Second mixing unit
207 D/A converter
208 Voice feedback unit
209 Digital audio packet transmitting unit

The invention claimed is:

1. A digital audio communication control apparatus comprising:
a first voice input unit that receives a voice from a specific speaker and outputs the voice as a first audio signal;
a second voice input unit that receives a voice of at least one speaker except for the specific speaker and outputs the voice as second audio signals;
a first mixing unit that mixes the first audio signal and the second audio signals with each other to generate at least one third audio signal and outputs the third audio signal;
a first voice output unit that receives at least one audio signal of the third audio signals and outputs the audio signal to an outside;
a second mixing unit that mixes one audio signal of the third audio signals and the first audio signal with each other to generate a fourth audio signal and outputs the fourth audio signal; and
a second voice output unit that outputs the fourth audio signal to the outside.

2. The digital audio communication control apparatus according to claim 1, wherein
the first voice input unit
includes a voice input unit that receives an analog voice input signal and an A/D converter that converts the analog voice input signal into a first digital audio stream, and transmits the first digital audio stream to the first mixing unit and the second mixing unit,
the second voice input unit
includes a digital audio packet receiving unit that receives digital data obtained by multiplexing a digital audio packet and a data packet constituting a digital audio stream of at least one speaker, extracts only the digital audio packet from the digital data, and outputs the digital audio packet, and
a digital audio packet separating unit that receives a digital audio packet from the digital audio packet receiving unit, separates the digital audio packet into individual digital audio packets for respective speakers, and constructs second digital audio streams for the respective speakers,
the second voice input units transmits the second digital audio stream constructed by the digital audio packet separating unit to the first mixing unit;
the first mixing unit
mixes the first digital audio stream received from the first voice input unit and the second digital audio stream received from the second voice input unit with each other to output at least one third digital audio stream,
the first voice output unit
includes a digital audio packet transmitting unit that receives at least one third digital audio stream from the first mixing unit, generates digital data obtained by multiplexing the third digital audio stream, and outputs the digital data,
the second mixing unit
receives one digital audio stream of the third digital audio streams, mixes the digital audio stream with the first digital audio stream, and outputs a fourth digital audio stream, and
the second audio output unit
includes a D/A converter that receives the fourth digital audio stream from the second mixing unit and converts the fourth digital audio stream into an analog voice output signal, and a voice feedback unit that outputs the analog voice output signal, and the voice feedback unit outputs the analog voice output signal.

3. The digital audio communication control apparatus according to claim 2, wherein
the first mixing unit
generates at least one third digital audio stream obtained by mixing the first digital audio stream with at least one digital audio stream that satisfies a specific condition in the second digital audio streams, outputs one digital audio stream of the third digital audio streams to the second mixing unit, and outputs the other third digital audio stream to the digital audio packet transmitting unit, and the second mixing unit generates the fourth digital audio stream obtained by mixing the first digital audio stream and one digital audio stream received from the first mixing unit with each other and outputs the fourth digital audio stream to the voice feedback unit.

4. The digital audio communication control apparatus according to claim 2, wherein the third digital audio stream generated by the first mixing unit and supplied to the second mixing unit does not include the first digital audio stream.

5. The digital audio communication control apparatus according to claim 2, wherein the first mixing unit performs audio level control and gain control when a plurality of digital audio streams are mixed with each other, and the second mixing unit performs only a process required for mixing of two digital audio streams by using a buffer smaller than that of the first mixing unit.

6. The digital audio communication control apparatus according to claim 2, wherein the voice input unit, the A/D converter, the D/A converter, and the voice feedback unit independently perform processes to a plurality of analog audio signals or a plurality of the fourth digital audio streams, and the second mixing unit independently performs processes to the plurality of first and third digital audio streams each including two digital audio streams.

7. The digital audio communication control apparatus according to claim 6, wherein the number of analog audio signals or the number of digital audio streams handled by the A/D converter, the D/A converter, and the voice feedback unit is 2, the number of combinations of mixing target digital audio streams handled by the second mixing unit is 2, one of the digital audio streams is used for an announcement, and a remaining one digital audio stream is used for a speech communication.

8. The digital audio communication control apparatus according to claim 1, wherein the first voice input unit includes a voice input unit that receives an analog voice input signal and an A/D converter that converts the analog voice input signal into a first digital audio stream, and transmits the first digital audio stream to the first mixing unit and transmits the analog voice input signal to the second mixing unit, the second voice input unit includes a digital audio packet receiving unit that receives digital data obtained by multiplexing a digital audio packet and a data packet constituting a digital audio stream of at least one speaker, extracts only the digital audio packet from the digital data, and outputs the digital audio packet, and a digital audio packet separating unit that receives a digital audio packet from the digital audio packet receiving unit, separates the digital audio packet into individual digital audio packets for respective speakers, and constructs second digital audio streams for the respective speakers, the second voice input units transmits the second digital audio stream constructed by the digital audio packet separating unit to the first mixing unit;

the first mixing unit mixes the first digital audio stream received from the first voice input unit and the second digital audio stream received from the second voice input unit with each other to output at least one third digital audio stream, the first voice output unit includes a digital audio packet transmitting unit that receives at least one third digital audio stream from the first mixing unit, generates digital data obtained by multiplexing the third digital audio stream, and outputs the digital data, the second mixing unit receives an analog voice conversion signal obtained by converting one digital audio stream of the third digital audio streams by the D/A converter, mixes the analog voice conversion signal with the analog voice input signal, and outputs an analog voice output signal, and the second audio output unit includes a voice feedback unit that outputs the analog voice output signal.

9. The digital audio communication control apparatus according to claim 8, wherein the first mixing unit generates at least one third digital audio stream obtained by mixing the first digital audio stream with at least one digital audio stream that satisfies a specific condition in the second digital audio streams, D/A-converts one digital audio stream of the third digital audio streams with the D/A converter to output the resultant signal as an analog voice conversion signal to the second mixing unit, and outputs the other third digital audio stream to the digital audio packet transmitting unit, and the second mixing unit generates the analog audio output signal obtained by mixing the analog voice input signal with the analog voice conversion signal received from the D/A converter to output the analog voice output signal to the voice feedback unit.

10. The digital audio communication control apparatus according to claim 8, wherein the third digital audio stream generated by the first mixing unit and supplied to the D/A converter does not include the first digital audio stream.

11. The digital audio communication control apparatus according to claim 8, wherein the first mixing unit performs audio level control and gain control when a plurality of digital audio streams are mixed with each other, and the second mixing unit performs only a process required for mixing of two digital audio streams by using a buffer smaller than that of the first mixing unit.

12. The digital audio communication control apparatus according to claim 8, wherein the voice input unit, the A/D converter, the D/A converter, and the voice feedback unit independently perform processes to a plurality of analog voice input signals or a plurality of the analog voice output signals, and the second mixing unit independently performs processes to the plurality of analog voice output signals and a plurality of the analog voice conversion signals each including two analog audio signals.

13. The digital audio communication control apparatus according to claim 12, wherein
the number of analog voice input signals, the number of analog voice conversion signals, or the number of analog voice output signals handled by the A/D converter, the D/A converter, and the voice feedback unit is 2,
one of the analog voice input signals, one of the analog voice conversion signals, or one of the analog voice output signals is used for an announcement, and a remaining one digital audio stream is used for a speech communication.

14. The digital audio communication control apparatus according to claim 3, wherein
a specific condition used when a digital audio stream generated by the first mixing unit is determined is applied to a digital audio stream used in an announcement to each area in which the announcement is occurring, digital audio streams of all members who participate in speech communications that are occurring, digital audio streams used in announcements to all areas in which the announcements are occurring, and digital audio streams of members obtained by excluding a specific speaker from all members who participate in a speech communication in which the specific speaker is participating.

15. The digital audio communication control apparatus according to claim 3, wherein
a specific condition used when a digital audio stream generated by the first mixing unit is determined is applied to a digital audio stream used in an announcement to each area in which the announcement is occurring, digital audio streams of all members who participate in speech communications that are occurring, digital audio streams used in an announcement defined in advance to be transferred to a specific speaker in announcements to all areas in which the announcements are occurring, and digital audio streams of members obtained by excluding a specific speaker from all members who participate in a speech communication in which the specific speaker is participating.

16. The digital audio communication control apparatus according to claim 7, wherein
the digital audio communication control apparatus is mounted to a vehicle such as an airplane or a train to provide an announcing function and a speech communication function.

17. The digital audio communication control apparatus according to claim 16, wherein
the voice input unit and the voice feedback unit are used in voice inputting/outputting with a specific person on a flight deck seat or motorman's seat.

18. The digital audio communication control apparatus according to claim 9, wherein
a specific condition used when a digital audio stream generated by the first mixing unit is determined is applied to a digital audio stream used in an announcement to each area in which the announcement is occurring, digital audio streams of all members who participate in speech communications that are occurring, digital audio streams used in announcements to all areas in which the announcements are occurring, and digital audio streams of members obtained by excluding a specific speaker from all members who participate in a speech communication in which the specific speaker is participating.

19. The digital audio communication control apparatus according to claim 9, wherein
a specific condition used when a digital audio stream generated by the first mixing unit is determined is applied to a digital audio stream used in an announcement to each area in which the announcement is occurring, digital audio streams of all members who participate in speech communications that are occurring, digital audio streams used in an announcement defined in advance to be transferred to a specific speaker in announcements to all areas in which the announcements are occurring, and digital audio streams of members obtained by excluding a specific speaker from all members who participate in a speech communication in which the specific speaker is participating.

20. The digital audio communication control apparatus according to claim 9, wherein
the digital audio communication control apparatus is mounted to a vehicle such as an airplane or a train to provide an announcing function and a speech communication function.

21. The digital audio communication control apparatus according to claim 20, wherein
the voice input unit and the voice feedback unit are used in voice inputting/outputting with a specific person on a flight deck seat or motorman's seat.

22. A digital audio communication control method comprising:
a voice input step of receiving an analog audio signal from a specific speaker;
an A/D converting step of converting an analog audio signal into a first digital audio stream;
a digital audio packet receiving step of receiving digital data obtained by multiplexing a digital audio packet and data packet that form a digital audio stream of at least one speaker except for the specific speaker and extracting only the digital audio packet from the digital data;
a digital audio packet separating step of separating the digital audio packet extracted in the digital audio packet receiving step into individual digital audio packets for respective speakers to construct second digital audio streams for the speakers;
a first mixing step of mixing the first digital audio stream with the second digital audio stream to generate at least one third digital audio stream;
a second mixing step of mixing the first digital audio stream with one digital audio stream of the third digital audio streams to generate a fourth output digital audio stream;
a digital audio packet transmitting step of multiplexing at least one of the third digital audio streams generated in the first mixing step to output the multiplexed stream outside of the apparatus;
a D/A converting step of converting the fourth digital audio stream generated in the second mixing step into an analog audio signal; and
a voice feedback step of outputting the analog audio signal converted in the D/A converting step outside of the apparatus.

23. The digital audio communication control method according to claim 22, wherein
the voice input step, the A/D converting step, the D/A converting step, and the voice feedback step independently perform processes to a plurality of analog audio signals or the plurality of fourth digital audio streams,
the second mixing step
independently performs processes to a plurality of the first and a plurality of the third digital audio streams each including two digital audio streams, and
at least one of the plurality of analog audio signals, the plurality of fourth digital audio streams, or the plurality of first and third digital audio streams is used for an announcement, and at least one of them is used for a speech communication.

\* \* \* \* \*